Jan. 18, 1955   F. P. STROTHER ET AL   2,699,701
YARN DIAMETER MEASURING AND RECORDING INSTRUMENT
Filed Aug. 1, 1950                                    3 Sheets-Sheet 1
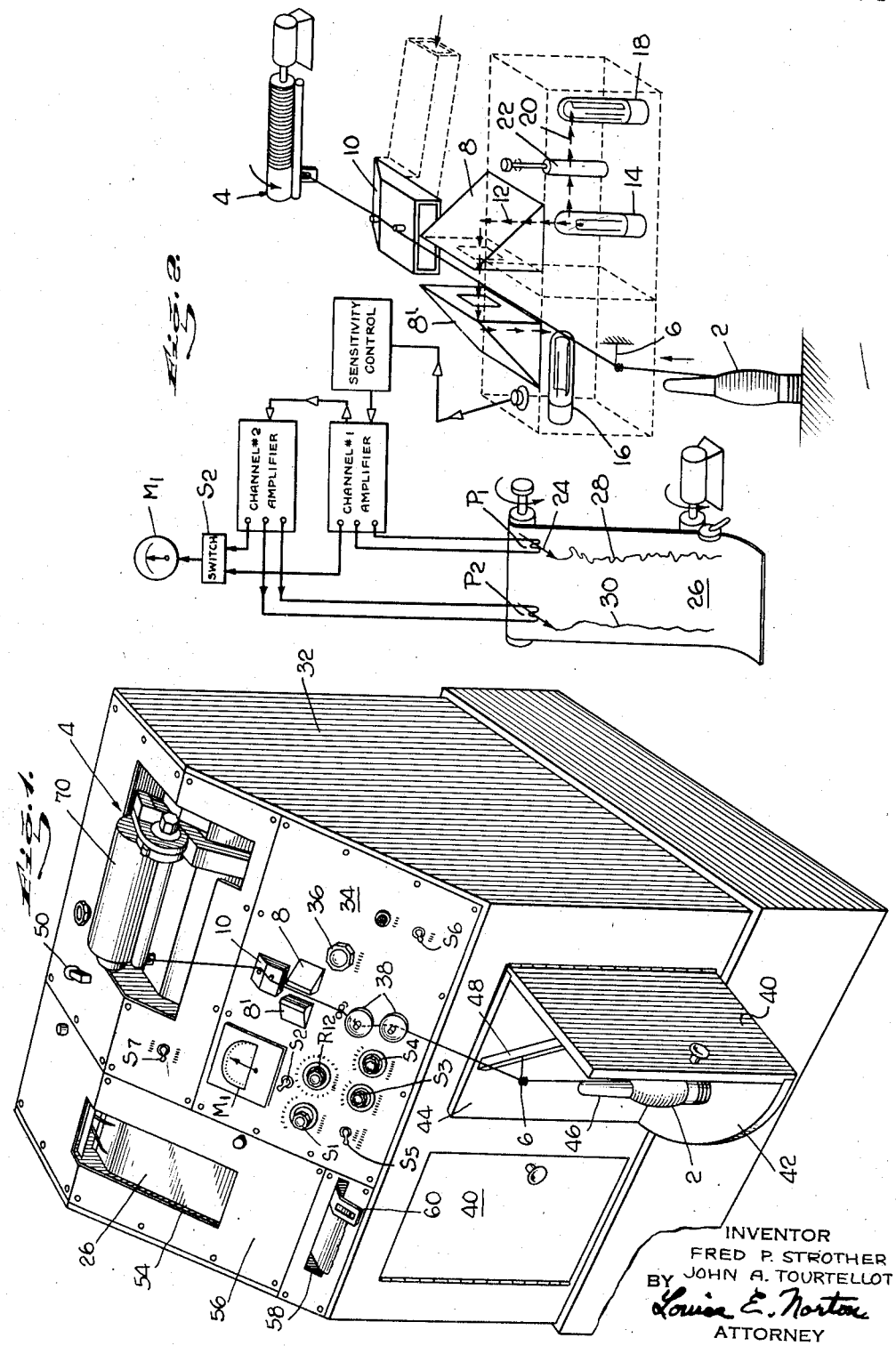
INVENTOR
FRED P. STROTHER
BY JOHN A. TOURTELLOT
Louise E. Norton
ATTORNEY Jan. 18, 1955   F. P. STROTHER ET AL   2,699,701
YARN DIAMETER MEASURING AND RECORDING INSTRUMENT
Filed Aug. 1, 1950   3 Sheets-Sheet 2
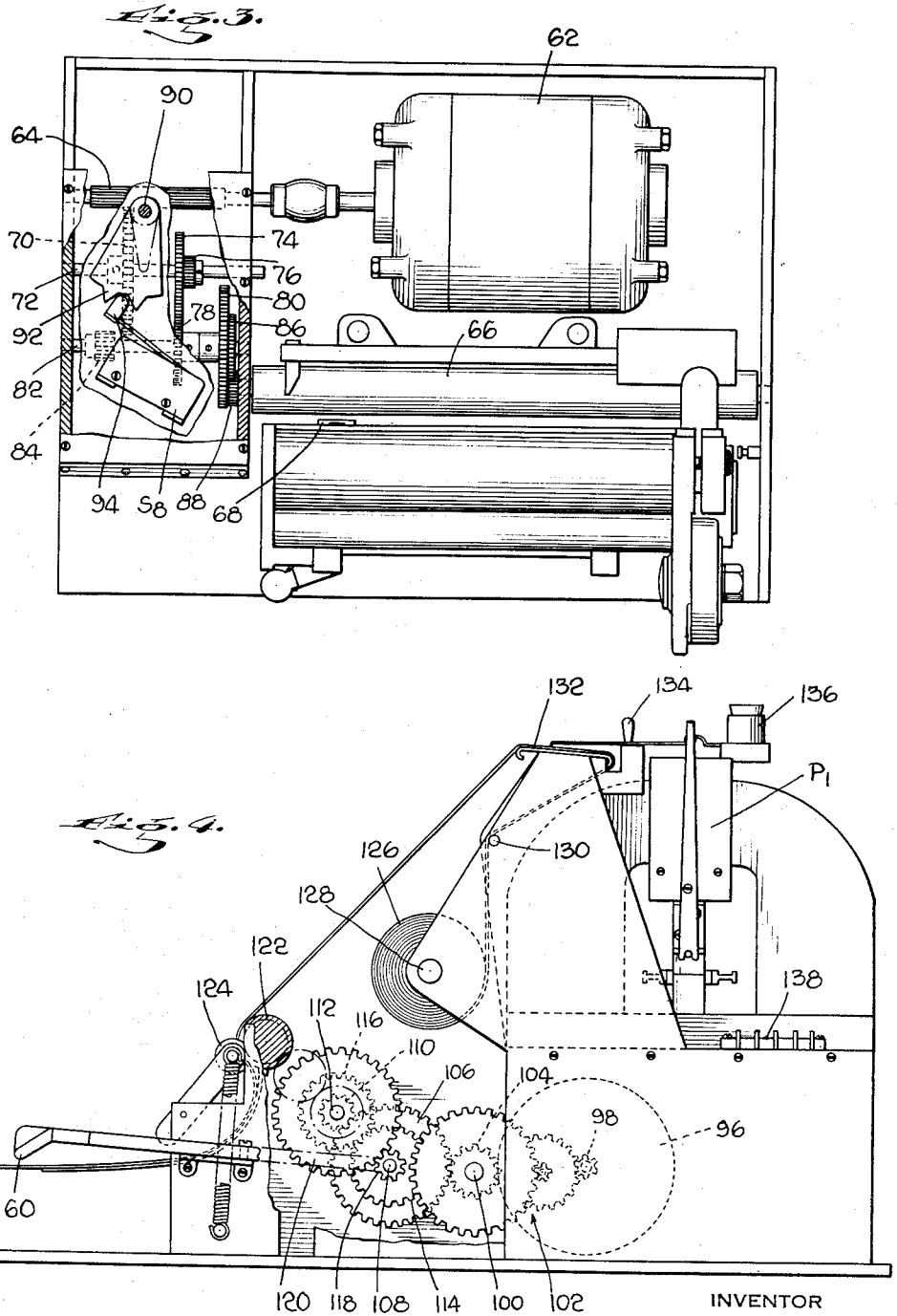
INVENTOR
FRED P. STROTHER
BY JOHN A. TOURTELLOT
Louisa E. Norton
ATTORNEY

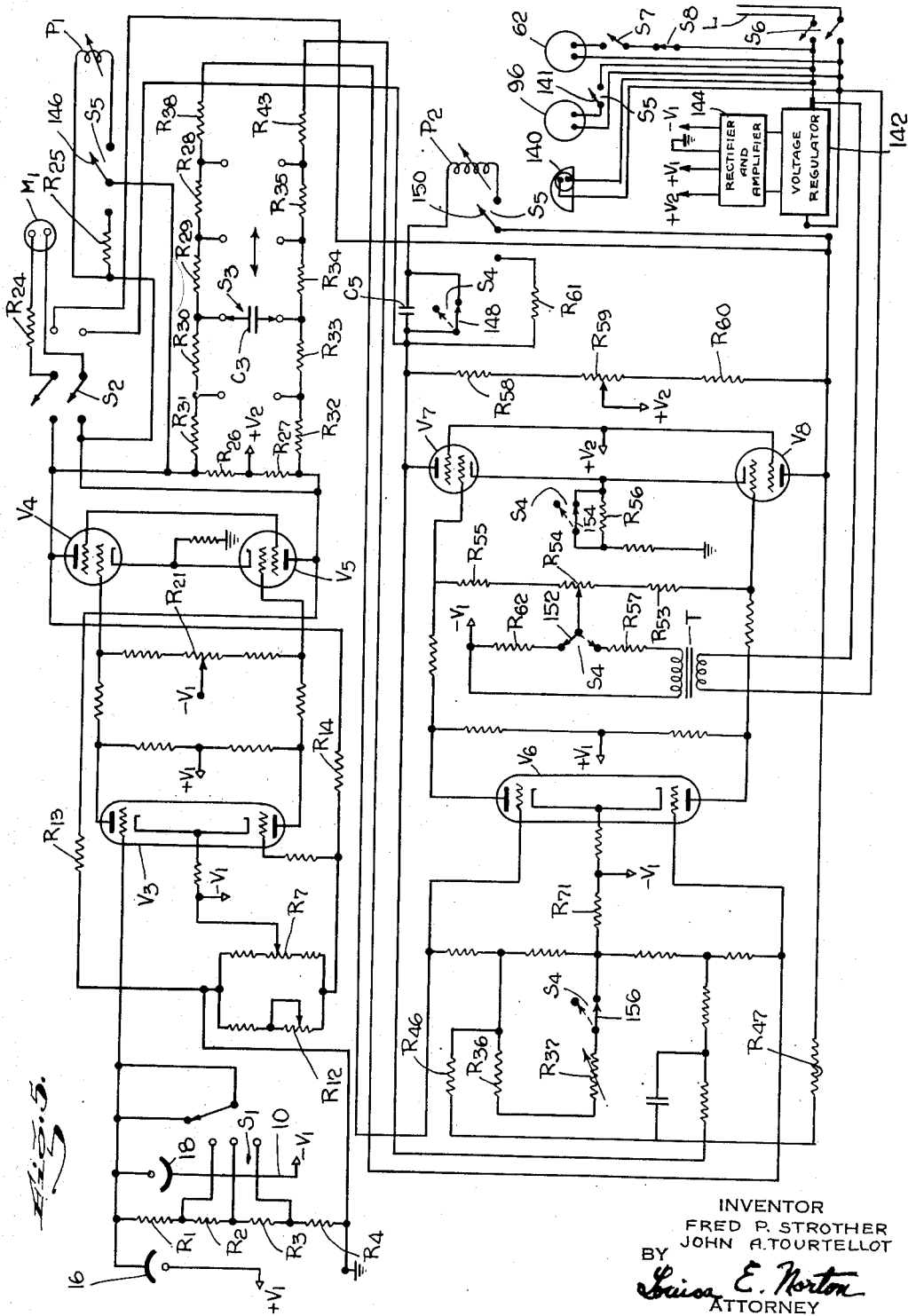

United States Patent Office 2,699,701
Patented Jan. 18, 1955

2,699,701

YARN DIAMETER MEASURING AND RECORDING INSTRUMENT

Fred P. Strother, Shawmut, Ala., and John A. Tourtellot, Merchantville, N. J., assignors to Deering Milliken Research Trust, Pendleton, S. C., a nonprofit trust of Maine Application August 1, 1950, Serial No. 177,004

7 Claims. (Cl. 88—14)

The present invention relates to measuring and recording instruments and more particularly to instruments for measuring and recording the diameter of traveling filamentary material such as yarn or wire and comprises a novel electronic device of this character which yield an accurate amplified record of diameter variations of filamentary material. The new device is particularly adapted for use as a uniformity meter for strands of relatively compressible material, such as yarn, as the diameter responsive element of the instrument does not require physical contact with the traveling strand.

In the new instrument an optical circuit, including a pair of prisms between which passes the strand to be measured, in conjunction with a light source and a circuit including a pair of photoelectric cells, serves for detection and measurement of strand diameter; amplifying and integrating circuits in conjunction with controlling switches serve to impress upon recording devices an amplified and, when desired, an integrated signal derived from the detecting and metering circuits; and adjustable speed drive means serve to pull the strand to be measured through the gap between the prisms and to drive the chart associated with the recording devices at selected relative rates.

A feature of the invention is the means whereby a double record of the strand diameter variations may be made simultaneously, one record showing substantially instantaneous diameter variations and the other showing changes in the average diameter of the strand.

Another feature of the invention is the means for ready adjustment of the sensitivity of the device and of the degree of integration employed in yielding a record of variations in the average diameter of the strand.

Still another feature of the invention is the means for modulating an alternating current with the amplified signal from the detecting circuit and recording such modulated current to give a visual and magnified representation of the strand.

Other features of the invention, including the means for preventing accumulation of fly or dust in the viewing slot, will become apparent as the description proceeds.

Reference may now be had to the accompanying drawings of which:

Fig. 1 is a perspective view of a yarn measuring and recording instrument representing a preferred embodiment of the invention;

Fig. 2 is an explanatory diagrammatic representation of the essential parts of the instrument of Fig. 1;

Fig. 3 is a plan view of the mechanisms for winding the yarn, parts being broken away to show the speed shifter gear train;

Fig. 4 is a vertical sectional view of the recording elements of the instruments of Fig. 1; and Fig. 5 is a diagram of the circuit of the instrument of Fig. 1.

The new instrument will first be described by reference to Fig. 2 wherein the essential parts of the instrument are shown diagrammatically. Yarn or other strand, the diameter of which is to be measured and recorded, is drawn over-end from a supply bobbin 2 by a take-up mechanism indicated generally at 4. The yarn, in its path from the bobbin to the take-up device, passes through the eye of a pigtail guide 6, then between opposing faces of a pair of prisms 8 and $8^1$ and around guides on an air duct 10. During passage between the prisms 8 and $8^1$ the yarn intercepts a beam of light, indicated by the chain 12 of small arrows, which is emitted by a lamp 14 and directed to the light sensitive cathode of a photoelectric-tube 16 by reflection from the sloping faces of the prisms. Light from the lamp 14 is also directed to the light sensitive cathode of a second photoelectric cell 18 as indicated by the chain 20 of small arrows.

A light valve 22 is interposed in the path of the light beam 20 for adjustment of the instrument for balance. Air from a blower (not shown in Fig. 2) issues from the duct 10 in a stream flowing along the yarn and between the prisms in a direction counter to that of the yarn travel and keeps the viewing slot free from fly and dust.

The tubes 16 and 18 are connected in a bridge type circuit, hereinafter described in connection with Fig. 5, to create a signal voltage varying with the diameter of the yarn intercepting the light beam 12. This signal voltage is passed through an attenuator, designated in Fig. 2 a "sensitivity control," to the first of two amplifier stages, designated in Fig. 2 "channel No. 1" and "channel No. 2." In channel No. 1 the signal is amplified to a value sufficient to energize the coil of a penmotor P1, the pen 24 of which engages a chart 26 moved in timed relation with the yarn as hereinafter described. The back and forth motion of the recording pen 24 in response to the signals from channel No. 1 combined with the linear motion of the chart 26 causes line 28 to be traced on the chart. Scales may be and preferably are printed on the chart from which yarn diameter and length may be determined.

The second amplifier, channel No. 2, receives its signal from channel No. 1 for actuation of penmotor P2. Channel No. 2 includes an adjustable integrating circuit whereby average or long term variations in yarn diameter may be recorded on the chart 26 by the pen of penmotor P2 as indicated by the trace 30. The deflections of traces 28 and 30 from a base line give a continuous indication of actual yarn diameter. In order that a magnified representation of the yarn silhouette may be made on the chart, if desired, circuit means are included in channel No. 2, as hereinafter described, for optionally delivering to penmotor P2 an alternating current modulated with the signal instead of the amplified and integrated signal yielding the trace 30. A meter $M_1$ together with a suitable switch $S_2$ is provided for indicating the output of either channel.

The physical appearance of the instrument, the general operation of which has just been described, is shown in Fig. 1 to which reference may now be had. A cabinet 32 of the lectern type houses the various parts of the instrument. The cabinet has a sloping panel 34 thereon upon which are mounted the various controlling switches, hereinafter more fully described in connection with Fig. 5, the control knob 36 for the light valve 22, the prisms 8 and $8^1$ defining the viewing slot, two disk type tension devices 38, and the dial of meter $M_1$. The outlet from air duct 10 is inserted in the panel 34 above the viewing slot.

The front wall of the cabinet 32 is provided with a pair of swinging doors 40, the right hand one of which is shown open in Fig. 1. This door has a base plate 42 and back panel 44 secured thereto and the base plate 42 carries a pin 46 upon which may be mounted the supply spool 2 of the yarn to be measured. A cross piece 48 connecting the door 40 and back panel 44 has the yarn guide 6 mounted thereon. Space within the cabinet behind the left hand door 40 is conveniently used for storage of chart paper.

The winder mechanism 4 for the yarn, which is mounted on the upper part of the cabinet beyond the viewing slot is of conventional constant speed type and will be described in connection with Fig. 3. Adjustment to any one of three speeds is effected by a manually operated arm 50 mounted on the top of the cabinet. The recording mechanism which is mounted within the left hand part of the cabinet will be explained in connection with Fig. 4. The pens of the penmotors $P_1$ and $P_2$ and the chart 26 are visible in Fig. 1 through a window 54 in a removable sloping panel 56. An operating arm 60 extending through slot 58 serves for selection of the chart speed.

The yarn winding mechanism 4, as shown best in Fig. 3, includes a motor 62 which drives an elongated pinion 64, a drum winder including a yarn drive roll 66 gear driven from pinion 64 at any one of three speeds and a yarn guide 68 by means of which the yarn package 70 (see Fig. 1) is traversed. The package 70 is not shown in Fig. 3 but it will be understood that it is moved by surface contact with the roll 66. As drum winders are well known and form no part of the present invention, it is not deemed necessary to describe or illustrate the details thereof or of the traversing mechanism associated therewith. The winder may be of the type manufactured by the Abbott Machine Co. of Wilton, New Hampshire. The coupling between pinion 64 and roll 66 includes a gear 70 which is keyed to a shaft 72 for longitudinal movement thereon and which is driven by the pinion 64 and gears 74 and 76 also keyed to shaft 72 and adapted to be shifted into driving engagement with gears 78 and 80 respectively on a shaft 82, gear 70 being adapted to be shifted into driving engagement with a gear 84 on shaft 82. A gear 86 on shaft 82 drives a gear 88 on the shaft of roll 66.

As gears 70, 74 and 76 are of different diameter, three different yarn speeds are available by shifting these gears along the shaft 72, a high speed, corresponding to a yarn speed of say 12.5 feet per second, when gears 70 and 84 are in mesh, an intermediate speed of say 2.5 feet per second when gears 74 and 78 are in mesh and a low speed of say 0.5 foot per second when gears 76 and 80 are in mesh. Shifting of the gears 70, 74 and 76 on shaft 72 is effected by rotation of a rod 90 to which is fixed the arm 50. In order to simplify the drawing the operating connection between rod 90 and the gears is not shown in the drawing but it will be understood that conventional means are employed to convert rotation of the rod 90 into translation of the gears along the shaft 72. As the winder should not be in operation during shifting of gears, an arcuate arm 92 having two angular teeth thereon is secured to the rod 90 for rotation therewith and the operating arm 94 of a switch S8 in the circuit of motor 62 is mounted for engagement by the fingers during shifting of the gears, the fingers opening the switch upon rotation of the arcuate arm 92 in either direction from the position illustrated in Fig. 3.

The essential parts of the recording element together with the operating means for shifting the chart speed are shown in Fig. 4 to which reference may now be had. The drive motor 96 for the chart, through a pinion 98 on its shaft, drives a shaft 100 through reduction gearing indicated generally at 102. An elongated pinion 104 on the shaft 100 meshes with a gear 106 keyed to a shaft 108 for longitudinal motion thereon under control of lever 60. In the position of lever 60 corresponding to high chart speed, say 5 inches per second, gear 106 meshes with a small gear 110 on shaft 112. Similarly a gear 114 keyed to shaft 108 meshes with a gear 116 on shaft 112 in the position of lever 60 corresponding to intermediate chart speed, say 1 inch per second and a gear 118 on shaft 108 meshes with gear 120 on shaft 112 in the position corresponding to low chart speed, say .25 inch per second. Shaft 112 through a friction roll coupling drives a drum 122. An idler roll 124 is spring biased into engagement with drum 122 and the chart paper is passed between drum 122 and idler roll 124 and advanced thereby at a rate determined by the position of arm 60. The paper chart is drawn from a supply roll 126 mounted on a shaft 128 journalled at its ends in suitable brackets within the instrument cabinet. The paper is led up from the roll 126 over a guide rod 130 then over a platform 132 beneath the pens of the penmotors and then down to the drum 122. During threading up of the paper the pens are lifted by a cam (not shown) operated by a handle 134. In Fig. 4 the ink supply for the pens is indicated at 136, one penmotor at $P_1$ and a terminal strip for the electrical connections to the motor at 138.

Reference may now be had to Fig. 5 in which the circuit of the complete instrument is diagrammatically shown. Power for the instrument is supplied by lines L which may be 60 cycle 115 volt single phase power lines. A double pole switch S6, when closed, connects the blower 140, the winder motor 62 and the recorder motor 96 across the lines L. A separate switch S7 and the switch S8 are provided in the leads to the winder motor 62 and one arm 141 of a switch S5 is provided in the leads to motor 96.

A voltage regulator 142 of conventional type, connected across the output terminals of switch S6 supplies power to a rectifier and amplifier unit 144 also of conventional type. The rectifier has four lines leading therefrom of voltages $-V_1$, zero or ground, $+V_1$ and $V_2$, which may be, for example, $-150$ volts, 0 volts, $+150$ volts and $+275$ volts respectively.

The diameter detecting circuit is shown in the upper left corner of Fig. 5 as comprising a balanced network including the photoelectric cells 16 and 18 connected in series, with the anode of cell 16 connected to $+V_1$, the cathode of cell 18 connected to $-V_1$ and the junction of the cells connected through resistors $R_1$, $R_2$, $R_3$ and $R_4$ to ground. The four-positioned coarse sensitivity control switch $S_1$ is provided for successively shunting the resistors $R_1$, $R_2$ and $R_3$.

The output from the bridge circuit is applied in push-pull to a double triode amplifying tube $V_3$ the output of which is impressed upon tubes $V_4$ and $V_5$. Part of the output from tubes $V_4$ and $V_5$ is employed as negative feed-back through resistors $R_{13}$ and $R_{14}$ to the input circuit of tube $V_3$ to stabilize the amplifier. Potentiometers $R_7$ and $R_{21}$ provide compensation for difference in the gain of the tubes. Resistor $R_{12}$ provides the fine sensitivity control by adjustment of the amount of feed-back. The above described amplifier circuit comprises the "channel #1" of Fig. 2 and the resistor $R_{12}$, switch $S_1$ and associated resistors the "sensitivity control" of Fig. 2.

The anode of tube $V_4$ is connected to a second movable arm 146 of the switch $S_5$, to one terminal of the meter switch $S_2$ and to $+V_2$ through a load resistor $R_{26}$. The anode of the tube $V_5$ is connected to one terminal of penmotor $P_1$, to one end of a resistor $R_{25}$, to a second fixed terminal of switch $S_2$ and to $+V_2$ through a load resistor $R_{27}$. The other terminal of penmotor $P_1$ and the other end of resistor $R_{25}$ are connected with the arm 146. terminals of switch $S_5$ associated with the arm 146. The meter $M_1$ is connected in series with a resistor $R_{24}$ across the movable arms of switch $S_2$. Thus the output of tubes $V_4$ and $V_5$ in one position of arm 146 of switch $S_5$ is delivered to penmotor $P_1$ and, when switch $S_2$ is closed in one direction (to the left as shown in Fig. 5) the output of the amplifier is delivered also to the meter $M_1$. Penmotor $P_1$ is cut out of the circuit and resistor $R_{25}$ substituted therefor when arm 146 of switch $S_5$ is closed in the other direction. When switch $S_2$ is closed in the other direction (to the right as viewed in Fig. 5) the output of channel #2, as hereinafter described, is delivered to the meter $M_1$.

The attenuator circuit, or "integration control" associated with channel #2 comprises resistors $R_{28}$ to $R_{31}$ inclusive connected in series with a resistor $R_{38}$ between the anode of tube $V_4$ and one grid of a double triode $V_6$, a second series of resistors $R_{32}$ to $R_{35}$ inclusive connected in series with a resistor $R_{43}$ between the anode of tube $V_5$ and the other grid of tube $V_6$ and a condenser $C_3$ which, in the illustrated position of a four position switch $S_3$, is connected between the junction of resistor $R_{29}$ and $R_{30}$ and the junction of resistors $R_{33}$ and $R_{34}$. Movement of the switch $S_3$ to the left or right, as viewed in Fig. 5, correspondingly shifts the location of the bridging condenser $C_3$. Although for convenience the switch $S_3$ has been indicated in the diagram of Fig. 5 as laterally movable, in practice a rotary type switch is employed, the control knob of which is shown in Fig. 1 and identified by the same symbol. The output of amplifier tube $V_6$ is directly coupled to amplifier tubes $V_7$ and $V_8$. A portion of the output of tubes $V_7$ and $V_8$ is employed as negative feed-back through resistors $R_{46}$ and $R_{47}$ to the input circuit of tube $V_6$. The anode of tube $V_7$ is connected to $+V_2$ through a resistor $R_{58}$ and a controllable part of a resistor $R_{59}$, to a terminal of meter switch $S_2$ and through an arm 148 of a switch $S_4$ when the switch is closed to one terminal of penmotor $P_2$. The anode of tube $V_8$ is connected to $+V_2$ through a resistor $R_{60}$ and the rest of resistor $R_{59}$, to the remaining terminal of meter switch $S_2$ and to a third movable arm 150 of switch $S_5$. A resistor $R_{61}$ is connected between the anode of tube $V_7$ and a fixed terminal of the switch $S_5$ associated with arm 150. The other terminal of switch $S_5$ associated with arm 150 is connected to the penmotor $P_2$. It will be understood that arms 141, 146 and 150 of switch $S_5$ are mechanically connected for conjoint operation so that when the recorder motor 96 is energized, the circuits of penmotors $P_1$ and $P_2$ are closed.

The operation of the circuit so far described will be readily apparent to those skilled in the art. With switch $S_6$ closed and switch $S_5$ thrown to the left as viewed in Fig. 5, switch $S_2$ is closed to connect the meter $M_1$ to the output of channel #1. With no yarn in the viewing slot between the prisms 8 and $8^1$ the light valve 22 is adjusted for zero reading of the meter corresponding to equal currents through the cells 16 and 18. The sensitivity of the circuit may then be adjusted with yarn of desired diameter in the viewing slot or preferably with a gauge comprising a rod of known diameter positioned in the slot, the coarse adjustment being made by means of switch $S_1$ and the fine adjustment by means of potentiometer $R_{12}$. Switch $S_2$ is then thrown to the right, as viewed in Fig. 5, to connect the output of channel #2 to the meter $M_1$ and fine adjustment made by varying the resistance of resistor $R_{37}$ in the input circuit of tube $V_6$. Switch $S_3$ is then set in accordance with the degree of integration desired in channel #2, switch $S_5$ is thrown to the right to energize the recorder motor 96 and to connect the penmotors to the respective channels and switch $S_7$ is closed to energize the winder motor 62, lever 60 and arm 50 having been previously set in accordance with the desired chart and yarn speeds, respectively.

With the above setup, the trace of the pen of penmotor $P_2$ will correspond in general with that indicated at 30 in Fig. 2. If a trace corresponding to the silhouette of the yarn is desired, then the parts of the circuit now to be described will be brought into operation so that an alternating current modulated by the signal will be delivered to penmotor $P_2$. These parts include a switch $S_4$ having in addition to the previously identified arm 148, arms 152, 154 and 156, all preferably mechanically connected for conjoint operation and a transformer T, the primary of which is connected across the output terminals of switch $S_6$. One end of the secondary of transformer T is connected to $-V_1$ and the other end of the secondary is connected through a resistor $R_{57}$ to a fixed terminal associated with the arm 152 of switch $S_4$. Arm 152 is connected to a movable tap on a resistor $R_{54}$ connected in series with resistors $R_{53}$ and $R_{55}$ across the input circuit of tubes $V_7$ and $V_8$. The other fixed terminal associated with arm 152 is connected with $-V_1$ through a resistor $R_{62}$.

Arm 148 of switch $S_4$, as heretofore described, is in the circuit of penmotor $P_2$. When in the position shown in full lines in Fig. 5 the arm shunts a condenser $C_5$. Arm 154 of switch $S_4$, when in the solid line position shown in Fig. 5 shunts a resistor $R_{56}$ in the common cathode circuit of tubes $V_7$ and $V_8$ and arm 156 in the dotted line position opens the branch of the input circuit containing the variable resistor $R_{37}$.

In Fig. 5 the arms 148, 152, 154 and 156 of switch $S_5$ are all shown in the modulation "off" position. When the switch is rotated counterclockwise to move the arms into the positions illustrated in dotted lines, a 60-cycle alternating current signal is applied through transformer T to the control grids of tubes $V_7$ and $V_8$. With no yarn measuring signal applied to tube $V_6$, potentiometers $R_{54}$ and $R_{59}$ can be adjusted so that little or no 60-cycle voltage appears across the output of the channel #2 amplifier. Then, when a yarn measuring signal is applied to tube $V_6$, the output voltage of the channel #2 amplifier is a 60-cycle sine wave, the amplitude of which is proportional to the instantaneous values of the integrated yarn measuring signal. The effect of this complex signal on the pen of penmotor $P_2$ is to cause it to vibrate at 60 cycles per second and with an amplitude which varies with the integrated yarn measuring signal, thus producing a trace on the chart which simulates a "silhouette" of the yarn.

From the foregoing description it will be apparent that the present invention provides a yarn uniformity meter and recorder that is simple to install and operate. The sensitivity of the device may be varied through a relatively wide range to permit analysis of yarns of widely different average diameter, and, as the gear sets of the yarn winder and chart drive are independently controllable, each permitting selection of three different speeds, nine combinations are possible. For example, if the three yarn winder speeds are 0.5, 2.5, and 12.5 feet per second and the three chart speeds are 1, 5 and 25 divisions per second, the gear sets can be adjusted so that 0.24 inch, 1.2 inches, 6 inches, 30 inches or 150 inches of yarn are recorded per chart division. Additionally the device permits adjustment of the degree of integration employed in producing the record of average diameter variations, the greater the integration the smoother the curve. The modulation control provides additional flexibility in yielding, when desired, a silhouette of the yarn. The value to the user of these various controls will be readily appreciated by those skilled in the art. Obviously various changes in the specific constructional details and in the specific circuit shown in the drawings could be made without departing from the spirit of the invention or the scope of the accompanying claims.

The following is claimed:

1. A yarn diameter meter and recorder comprising in combination a support member, yarn winder mechanism mounted on said member, operator controlled means associated with said winder mechanism for changing the winding rate, said winding mechanism including a motor and an energizing circuit therefor, means responsive to operation of said mentioned operator controlled means for automatically opening said energizing circuit during change in winding rate, yarn supply package support means mounted on said support member, diameter responsive means mounted on said member and positioned to detect variations in the diameter of yarn traveling to the winder from a supply package on said support means, said diameter responsive means including a pair of light redirecting means positioned to provide a viewing slot therebetween for passage of yarn therethrough, a source of light, and a pair of light sensitive devices, one positioned to receive light directly from said source and the other adapted to receive light from said source after redirection by said light redirecting means, a circuit connected to said light sensitive devices and responsive to the difference in the quantity of light incident thereon, a recorder carried by said support member and controlled by said circuit, said recorder including a plurality of recording elements, and means for moving a record receiving sheet beneath said recording elements.

2. A yarn diameter meter and recorder comprising in combination a cabinet, yarn winder mechanism mounted within said cabinet, yarn supply package support means carried by said cabinet, diameter responsive means mounted at least in part within said cabinet and positioned to detect variations in the diameter of yarn traveling to the winder from a supply package on said support means, said cabinet having an apertured panel forming a part of its upper surface, said diameter responsive means including a pair of light redirecting elements mounted in apertures in said panel on either side of the path of yarn traveling from a package on the yarn supply support means to the winder mechanism to provide a viewing slot therebetween for the yarn passing therethrough, a source of light within said cabinet, a pair of light sensitive devices within said cabinet, one of said devices being positioned to receive light directly from said source and the other adapted to receive light from said source after redirection by said light redirecting means, a circuit within the cabinet connected to said light sensitive devices and responsive to the difference in quantity of light incident thereon, a recorder within said cabinet and controlled by said circuit, said recorder including a plurality of recording elements, means for moving a record receiving sheet beneath said recording elements, and control means for said circuit, for said winder mechanism and for said means for moving a record receiving sheet all carried within said cabinet and accessible externally thereof.

3. The yarn diameter meter and recorder according to claim 2 wherein said cabinet includes a hinged door having said supply package support means secured to its inner wall and yarn guide means carried by said door for leading yarn from a supply package on the support means therefor to the viewing slot when the door is open.

4. The yarn diameter meter and recorder according to claim 2 including a blower mounted within said cabinet and a duct connected to said blower having an air outlet projecting through said panel and oriented to direct a stream of air through said viewing slot and counter to the direction of yarn travel.

5. A yarn diameter meter and recording device comprising in combination a support member, yarn winder mechanism mounted on said member, said yarn winder mechanism including a driving roll, an electric motor, a variable speed transmission coupling said motor and said roll, an operator controlled means for changing the output speed of said transmission to enable said drive roll to be driven at different speeds to change the yarn winding rate, switch mechanism associated with said operator controlled means and said motor operative to de-energize the motor circuit during a change from one transmission speed to another, yarn supply package support means mounted on said support member, diameter responsive means mounted on said member and positioned to detect variations in the diameter of yarn traveling to the winder from a supply package on said support means, said diameter responsive means including a pair of light redirecting means positioned to provide a viewing slot therebetween for passage of yarn therethrough, a source of light and a pair of light sensitive devices, one positioned to receive light directly from said source and the other adapted to receive light from said source after redirection by said light redirecting means, a circuit connected to said light sensitive devices and responsive to the difference in the quantity of light incident thereon, a recorder carried by said support member and controlled by said circuit, said recorder including a plurality of recording elements, and means for moving a record receiving sheet beneath said recording elements.

6. A yarn diameter meter and recording device comprising a support member, yarn winder mechanism mounted on said member, operator controlled means associated with said winder mechanism for changing the winder rate, said winder mechanism including a motor and an energizing circuit therefor, means responsive to operation of said operator controlled means for automatically opening said energizing circuit during change in winding rate, yarn supply package support means mounted on said support member, diameter responsive means mounted on said member and positioned to detect variations in the diameter of yarn traveling to the winder from a supply package on said support means, a recorder carried by said support member and having a recording element, said recording element being operative in response to said detected variations in yarn diameter, and means for moving a record receiving sheet beneath said recording elements.

7. A yarn diameter meter and recording device comprising a support member, yarn winder mechanism mounted on said member, said yarn winder mechanism including a driving roll, an electric motor, a variable speed transmission coupling said motor and said roll, an operator controlled means for changing the output speed of said transmission to enable said drive roll to be driven at different speeds to change the yarn winding rate, switch mechanism associated with said operator controlled means and said motor operative to de-energize the motor circuit during a change from one transmission speed to another, yarn supply package support means mounted on said support member, diameter responsive means mounted on said member and positioned to detect variations in the diameter of yarn traveling to the winder from a supply package on said support means, a recorder carried by said support member and having a recording element, said recording element being operative in response to said detected variations in yarn diameter, and means for moving a record receiving sheet beneath said recording element.

References Cited in the file of this patent

UNITED STATES PATENTS

| Number | Name | Date |
|---|---|---|
| 1,908,610 | Jones | May 9, 1933 |
| 1,915,204 | Scheibli | June 20, 1933 |
| 2,139,474 | Shepard, Jr. | Dec. 6, 1938 |
| 2,324,304 | Katzman | July 13, 1943 |
| 2,339,204 | Stockbarger et al. | Jan. 11, 1944 |
| 2,371,192 | Short | Mar. 13, 1945 |
| 2,517,330 | Marenholtz | Aug. 1, 1950 |
| 2,520,936 | Ingham, Jr. | Sept. 5, 1950 |
| 2,524,564 | Gorham | Oct. 3, 1950 |
| 2,654,288 | Savedelis | Oct. 6, 1953 |

OTHER REFERENCES

Sostman: "A New Method of Recording Flight Data," published January 1, 1950, in "Instruments," vol. 23, pages 36–37.